United States Patent
Sato et al.

(10) Patent No.: US 8,705,980 B2
(45) Date of Patent: Apr. 22, 2014

(54) OPTICAL MODULATION DEVICE AND OPTICAL MODULATION METHOD

(75) Inventors: Kenji Sato, Tokyo (JP); Shinya Sudo, Tokyo (JP)

(73) Assignee: NEC Corporation, Tokyo (JP)

( * ) Notice: Subject to any disclaimer, the term of this patent is extended or adjusted under 35 U.S.C. 154(b) by 158 days.

(21) Appl. No.: 13/508,721

(22) PCT Filed: Sep. 28, 2010

(86) PCT No.: PCT/JP2010/005819
§ 371 (c)(1),
(2), (4) Date: May 8, 2012

(87) PCT Pub. No.: WO2011/061886
PCT Pub. Date: May 26, 2011

(65) Prior Publication Data
US 2012/0224856 A1    Sep. 6, 2012

(30) Foreign Application Priority Data
Nov. 19, 2009   (JP) .................................. 2009-264078

(51) Int. Cl.
H04B 10/12    (2011.01)
(52) U.S. Cl.
USPC ............................ 398/183; 398/182; 398/187
(58) Field of Classification Search
USPC ......................................... 398/182, 183, 187
See application file for complete search history.

(56) References Cited

U.S. PATENT DOCUMENTS

| | | | |
|---|---|---|---|
| 6,141,141 A | 10/2000 | Wood | |
| 2002/0171900 A1* | 11/2002 | Ono et al. | 359/181 |
| 2007/0127932 A1* | 6/2007 | Qi et al. | 398/188 |
| 2009/0074407 A1* | 3/2009 | Hornbuckle et al. | 398/43 |
| 2010/0054756 A1* | 3/2010 | Nishihara et al. | 398/185 |

FOREIGN PATENT DOCUMENTS

| | | |
|---|---|---|
| JP | 10-213830 A | 8/1998 |
| JP | 2005-311722 A | 11/2005 |
| JP | 3789784 B2 | 6/2006 |
| JP | 2009-188509 A | 8/2009 |
| JP | 2009-253754 A | 10/2009 |

OTHER PUBLICATIONS

International Search Report in PCT/JP2010/005819 dated Dec. 21, 2010 (English Translation Thereof).

(Continued)

*Primary Examiner* — Ken Vanderpuye
*Assistant Examiner* — Mina Shalaby
(74) *Attorney, Agent, or Firm* — McGinn IP Law Group, PLLC (57) ABSTRACT

The present invention has an object to provide an optical modulation device and an optical modulation method that achieve an excellent spectral efficiency with a simple and compact configuration and low power consumption. An optical modulation device according to an exemplary aspect of the present invention includes a CW light source (11), a coupler (12), optical modulators (14a) and (14b), an optical frequency shifter (15b), a serial-to-parallel converter (21), and a delay circuit (24a). The serial-to-parallel converter (21) divides a data signal having a bit rate B into two data strings having a bit rate B/2, and extracts a clock signal (CLK). The delay circuit (24a) temporally synchronizes the two data strings. CW light emitted from the CW light source is split into two beams by the coupler (12). The optical modulators (14a) and (14b) generate optical signals by modulating the two split light beams according to the data strings. The optical frequency shifter (15b) shifts center frequencies of the optical signals by $\Delta f = B/(2 \times 2)$ according to the clock signal (CLK).

20 Claims, 6 Drawing Sheets

(56) References Cited

OTHER PUBLICATIONS

A. Lowery, "Optical OFDM", 2008, CLEO2008, CWN1.
Takayuki Kobayashi, et al., "100Gb/s-class optical OFDM transmission experiment for high-capacity Optical Transport Network", IEICE Technical Report, 2008, OCS 2008-27.

Y. Ma, et al., "1-Tb/s per Channel Coherent Optical OFDM Transmission with Subwavelength Bandwidth Access", 2009, OFC2009, PDP C-1.
S. Shimotsu, et, al., "Wideband frequency conversion with LiNbO3 optical single-sideband modulator", 2001, OFC2001, WK3-1.

* cited by examiner

OPTICAL MODULATION DEVICE AND OPTICAL MODULATION METHOD

TECHNICAL FIELD

The present invention relates to an optical modulation device and an optical modulation method, and more particularly, to an optical modulation device and an optical modulation method which are used for optical OFDM modulation.

BACKGROUND ART

In optical communication systems in intermediate-distance and long-distance networks, larger capacity transmission has been developed due to higher speed operation and wavelength multiplexing. In the recent optical communication systems in trunk networks, wavelength multiplexing optical communication is used and a wavelength channel spacing is set. If the interval is 50 GHz within the bandwidth of an optical fiber amplifier, about 100 channels can be used.

In the wavelength multiplexing optical communication, one wavelength (=channel) of light is used as a carrier. In general, a bandwidth of 50 GHz is used in one channel, and a moderate bandwidth is used to prevent occurrence of crosstalk between adjacent channels. For example, non-return-to-zero (NRZ) signals use a bandwidth of about 10 GHz at a transmission speed of 10 Gb/s, which enables use of all channels without interfering with adjacent channels.

Assuming herein that the channel spacing is $\Delta f[Hz]$ and the transmission speed is $B[bit/s]$, $B/\Delta f[bit/s/Hz]$ is referred to as "spectral efficiency". It is generally known that the theoretical limitation of the spectral efficiency in the NRZ is $1[bit/s/sHz]$ (Patent Literature 1). In the case where the transmission speed is 10 Gb/s and the channel spacing is 50 GHz, the spectral efficiency is $0.2[bit/s/Hz]$. Since the optical fiber amplifier has a limited bandwidth, high-density communications capable of improving the spectral efficiency are desirable in terms of the efficiency in optical spectral regions. However, simply increasing the transmission speed to improve the spectral efficiency causes a problem of crosstalk between channels. In this regard, Patent Literature 1 discloses a technique for applying an orthogonal frequency-division multiplexing (hereinafter "OFDM") method to optical communications.

Another method is proposed in which the OFDM technique is used to decompose data having a high bit rate into signals having a low bit rate by inverse Fourier series using electric signals, and the signals thus obtained are carried in a plurality of orthogonal subcarriers and optically transmitted (Non Patent Literature 1). This solves the problem of crosstalk and improves the spectral efficiency.

As examples of such an optical OFDM technique using the OFDM in optical communications, there are disclosed a method of generating OFDM signals mainly by electric signal processing (Non Patent Literature 1), a method of generating optical OFDM signals by superimposing data signals to be multiplexed using a multi-wavelength light source having a constant frequency spacing (Non Patent Literature 2), and a method of reducing the number of ports that are not available for data communication in the optical OFDM (Patent Literature 2). Along with the popularization of the Internet, for example, the amount of information to be dealt with by devices, such as servers and routers, has been rapidly increasing. Accordingly, the transmission capacity of signals to be exchanged between semiconductor components such as an LSI (Large Scale Integration) constituting these devices is expected to continuously increase rapidly in the future. Under such circumstances, a higher transmission speed and a larger transmission capacity of signals to be transmitted between semiconductor components such as an LSI are key issues.

CITATION LIST

Patent Literature

PTL 1: Japanese Patent No. 3789784
PTL 2: Japanese Unexamined Patent Application Publication No. 2009-188509

Non Patent Literature

NPL 1: A. Lowery, "Optical OFDM", 2008, CLEO2008, CWN1
NPL 2: Takayuki Kobayashi, and three other persons, "100 Gb/s-class optical OFDM transmission experiment for high-capacity Optical Transport Network", IEICE Technical Report, 2008, OCS 2008-27
NPL 3: Y. Ma, and other four persons, "1-Tb/s per Channel Coherent Optical OFDM Transmission with Subwavelength Bandwidth Access", 2009, OFC2009, PDP C-1
NPL 4: S. Shimotsu, and other four persons, "Wideband frequency conversion with LiNbO3 optical single-sideband modulator", 2001, OFC2001, WK3-1

SUMMARY OF INVENTION

Technical Problem

However, the optical OFDM transmission technique mainly using electric signal processing as disclosed in Non Patent Literature 1 has a problem in that the electric signal processing speed is limited. In the previously reported examples, each subcarrier has a bit rate of less than gigabits per second and an extremely large number of subcarriers are used for a transmission speed exceeding gigabits per second, which is a general transmission speed in optical communications, resulting in an increase in load of electric circuit processing and in circuit power consumption, for example. This is disadvantageous in practical use.

Additionally, in order to generate optical OFDM signals as disclosed in Non Patent Literature 2, it is necessary to use a multi-wavelength light source having a constant frequency spacing, that is, a so-called supercontinuum (hereinafter "SC") light source. An optical OFDM modulator using the SC light source, however, has drawbacks as described below. That is, the SC light source is formed of a mode-locked fiber laser or the like, which requires a large-scale configuration for stabilizing the wavelength and frequency. This poses problems in laser efficiency (power consumption), operation stability, and noise. Further, the frequency of a modulation circuit in the SC light source (mode-locked laser) for specifying the frequency spacing and the bit rate of each signal are individually set, which makes it difficult to perform Fourier transform with precision.

Furthermore, the method disclosed in Patent Literature 1 is based on the premise that a sampling frequency $\Delta f$ is higher than a bit rate B of each signal. In this configuration, Fourier transform is performed on each bit in an analog manner. This makes it difficult to implement an optical OFDM operation in a digital manner.

The present invention has been made in view of the above-mentioned circumstances, and therefore an object of the present invention is to provide an optical modulation device and an optical modulation method that achieve an excellent spectral efficiency with a simple and compact configuration and low power consumption.

Solution to Problem

An exemplary aspect of the present invention is an optical modulation device including: a converter that receives a data signal having a bit rate of B[Gb/s], divides the data signal into N data strings each having a bit rate of B/N (N is an integer equal to or greater than 2)[Gb/s], and extracts at least one clock signal from the data signal; synchronization means for synchronizing the N data strings; a light source that emits continuous wave light; an optical demultiplexer that splits the continuous wave light into N light beams; modulation means for generating N optical signals by modulating the N split continuous wave light beams according to the synchronized N data strings; and optical frequency shift means for shifting center frequencies of the N optical signals by $\Delta f = B/(2N)$ [GHz] according to the clock signal.

Another exemplary aspect of the present invention is an optical modulation method including: dividing a data signal having a bit rate of B[Gb/s] into N data strings each having a bit rate of B/N (N is an integer equal to or greater than 2)[Gb/s], and extracting at least one clock signal from the data signal; synchronizing the N data strings; splitting continuous wave light emitted from a light source into N light beams; generating N optical signals by modulating the N split continuous wave light beams according to the N data strings synchronized; and shifting center frequencies of the N optical signals by $\Delta f = B(2N)$[GHz] according to the clock signal.

Advantageous Effects of Invention

According to an exemplary aspect of the present invention, it is possible to provide an optical modulation device and an optical modulation method that achieve an excellent spectral efficiency with a simple and compact configuration and low power consumption.

DESCRIPTION OF EMBODIMENTS

First Exemplary Embodiment

Figure 1:
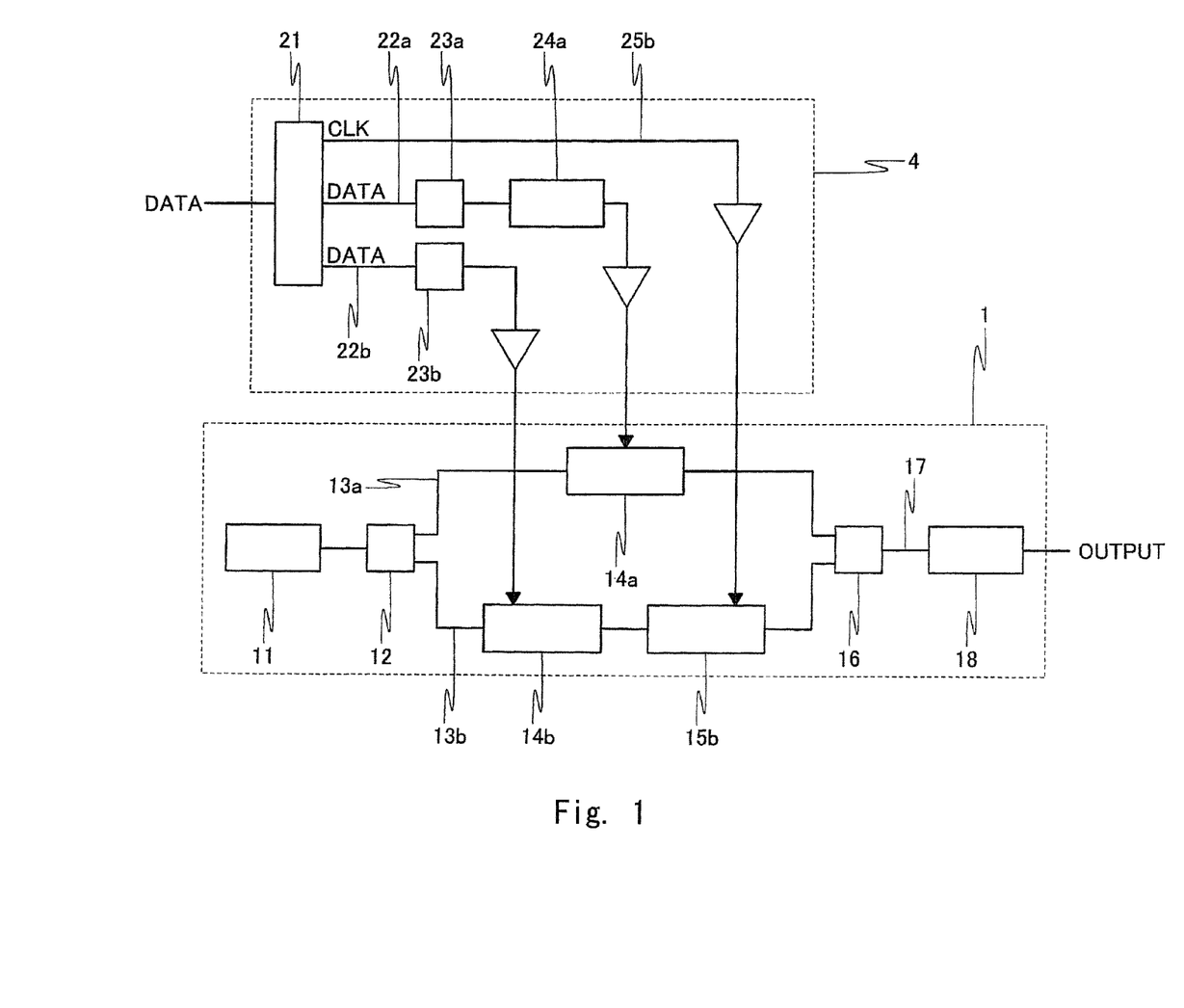
FIG. 1 is a block diagram showing an optical OFDM modulator according to a first exemplary embodiment.

Hereinafter, an exemplary embodiment of the present invention will be described with reference to the drawings. An optical OFDM modulator according to a first exemplary embodiment has a configuration in which a bit delay circuit (data string synchronizing means) and an optical frequency shifter are used instead of using an SC light source. FIG. 1 is a block diagram showing a configuration of an optical OFDM modulator 100 according to this exemplary embodiment. FIG. 1 illustrates a configuration when N=2 assuming that the number of divided optical signals is represented by N. As shown in FIG. 1, the optical OFDM modulator 100 includes a modulator unit 1 and an electric circuit unit 4.

The modulator unit 1 has a configuration in which a continuous wave (hereinafter "CW") light source 11 serving as a laser light source having a constant intensity is optically coupled with a first optical line 13a and a second optical line 13b through a coupler 12 serving as a 1×2 optical demultiplexer. The first optical line 13a is provided with a first optical modulator 14a. The second optical line 13b is provided with a second optical modulator 14b and an optical frequency shifter 15b. The first optical line 13a and the second optical line 13b are optically coupled with a third optical line 17 through a coupler 16 serving as a 2×1 optical multiplexer. The third optical line 17 is optically coupled with an optical amplifier 18, and the optical amplifier 18 is connected to an output OUTPUT.

In the electric circuit unit 4, data signal DATA having a bit rate of B=10[Gbit/s] is divided into two data strings by a serial-to-parallel converter 21. Specifically, 5[Gbit/s] data strings are generated by dividing the data signal in parallel for every two bits, for example. The generated data strings are respectively supplied to a first data line 22a and a second data line 22b. To limit the band of each of the data strings respectively passing through the first data line 22a and the second data line 22b, the first data line 22a and the second data line 22b are respectively provided with a first lowpass filter 23a and a second lowpass filter 23b each having a cut-off frequency of 5 GHz. The first data line 22a is also provided with a delay circuit 24a that delays the data string passing through the first data line 22a by $\Delta t$[s] ($\Delta t$=100 picoseconds). The data strings passing through the first data line 22a and the second data line 22b are respectively input to the first optical modulator 14a and the second optical modulator 14b.

The serial-to-parallel converter 21 extracts a clock signal CLK having a frequency of 2.5 GHz in the process of generating the 5[Gbit/s] data strings after parallel conversion. This clock signal CLK has a sine-curve waveform and is input to the optical frequency shifter 15b through a clock signal line 25b. As a result, a frequency shift of 2.5 GHz is applied to the optical signal passing through the second optical line 13b. Accordingly, there is a frequency shift of 2.5 GHz between the optical signal passing through the first optical line 13a and the optical signal passing through the second optical line 13b. These optical signals are added and output by the coupler 16.

This configuration enables implementation of a discrete Fourier transform using a bit delay circuit and an optical frequency shifter, without using any SC light source, and enables generation of an optical OFDM signal. The details thereof will be described below. In this configuration, a data string having a bit rate of B[bit/s] is converted from serial data to parallel data. Assuming that a time corresponding to 1-bit data at this time is $\Delta t$[s], $\Delta t = 1/B$ holds. Herein, assuming the discrete Fourier series expanded using an integer N (N is equal to or greater than 2), the data signal is divided in parallel into N signals. In other words, the data signal is converted in parallel bit by bit, with the result that N data strings are generated. In the data strings, there is a time interval of $\Delta t \times (N-1)$ between the arrival of data for one bit and the subsequent data. This corresponds to a decrease in bit rate of each data string to B/N[bit/s].

Next, assume that each of the N divided data strings is temporarily given a number "K". "K" is an integer in the range from 0 to N−1. A lowpass filter (hereinafter "LPF") is applied to each of the data strings K (K=0 to N−1), thereby compressing the signal band. In general, the frequency band of a serial signal before division is broader than the bit rate B, and the band is assumed as $B_{orig}$[Hz]. In other words, though each of the N divided data strings has a frequency band of $B_{orig}$/N[Hz], the use of the LPF allows frequency bands exceeding B/N[bit/s] to be cut off. Accordingly, each of the data strings has a bit rate of B/N[bit/s] and a band of B/N[Hz].

Next, a delay of Δt×K is applied to the data strings K (=0 to N−1) to thereby temporally synchronize data items in each of the data strings. That is, the delay circuit 24a functions as synchronization means for synchronizing the data strings. On the other hand, also on the side of the modulator unit, light emitted from a single CW light source is split into N light beams. The N split light beams are each modulated by optical modulators K (=0 to N−1). The optical modulators K (=0 to N−1) receive the data strings K in such a manner that the optical modulators and the data strings are associated in one-to-one correspondence. The optical frequency shifter shifts the optical frequency of each optical signal, which is generated by modulating the N split light beams, with a magnitude of Δf×k. Herein, a frequency shift Δf[Hz] is expressed as Δf=1/(2Δt×N). Thus, the orthogonality conditions are satisfied by Fourier transform, and B=2NΔf[Hz] holds.

To reduce errors in the discrete Fourier transform to be small enough to be practically neglected in this configuration, a serial-to-parallel converter may be used to extract a clock signal from a data signal to generate a sine curve having a frequency of Δf×K, and the sine curve thus generated may preferably be used for optical frequency shifting.

Lastly, the optical signals are synthesized by an optical coupler having N×1 branches. As a result, a synthesized signal S(t) satisfies the following Formula (1) representing a discrete Fourier transform.

[Formula 1]

$$S(t) = \sum_{K=0}^{N-1} F(t) e^{\left(j2\pi\Delta f \cdot K \cdot \frac{t}{N}\right)} \quad (1)$$

Thus, the light is split into the number of division N and the discrete Fourier transform is implemented in the manner as defined. This enables generation of the optical OFDM signal through digital signal processing.

Figure 2:
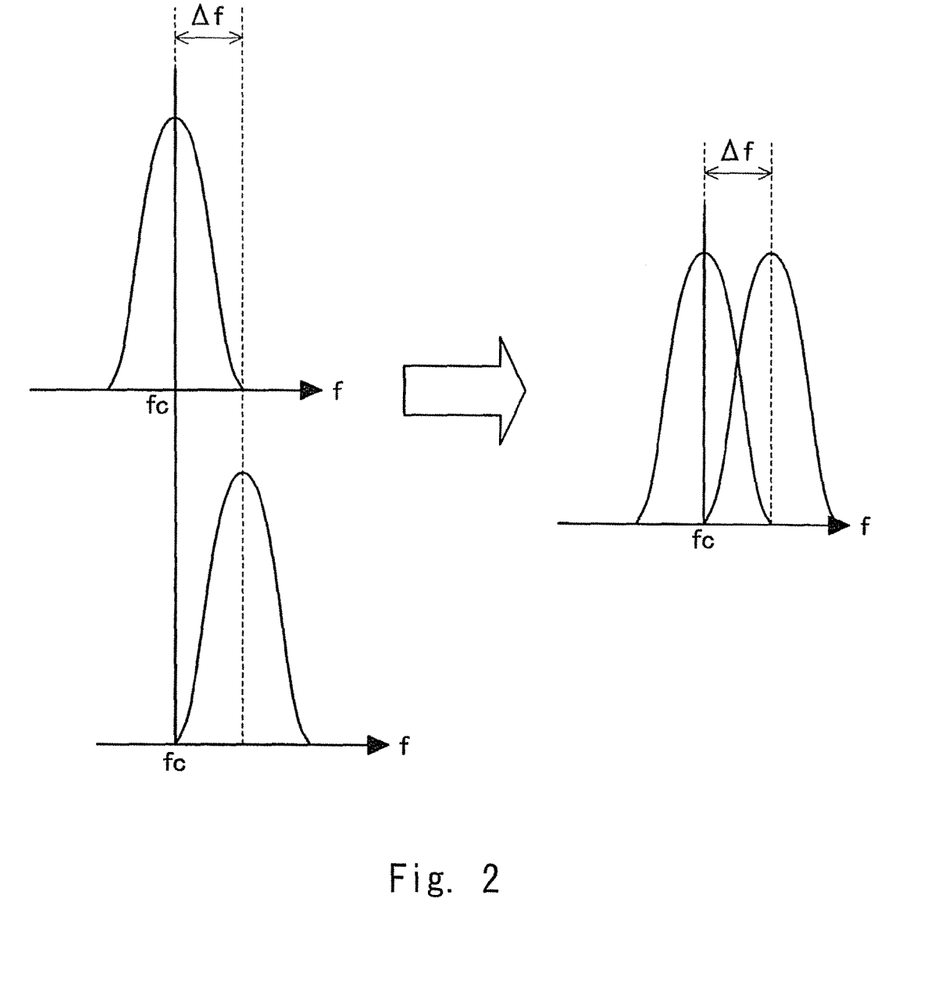
FIG. 2 is an optical frequency-division multiplexing spectrum generated by the optical OFDM modulator according to the first exemplary embodiment.

Specifically, in the optical OFDM modulator 100, optical signals each having a frequency band of about 5 GHz are transmitted in an overlapped manner at intervals of 2.5 GHz. Accordingly, the entire frequency band is expressed as 5 GHz (each band)×2−2.5 GHz (overlap)=7.5 GHz. This produces the effect of compressing the frequency band to be smaller than 10 GHz, which is a frequency band with no overlap, and improving the spectral efficiency. FIG. 2 illustrates an optical frequency-division multiplexing spectrum generated by the optical OFDM modulator 100. In FIG. 2, "fc" represents a center wavelength of a channel. Herein, assuming that B=10 GHz, N=2, and Δf=2.5 GHz, B=2NΔf holds. This is a condition for the discrete Fourier transform in the digital signal processing, and subcarriers are orthogonal to each other. Further, since a delay time Δt and a clock frequency Δf are directly extracted from the data rate, no error is generated in principle during the Fourier transform.

Second Exemplary Embodiment

Figure 3:
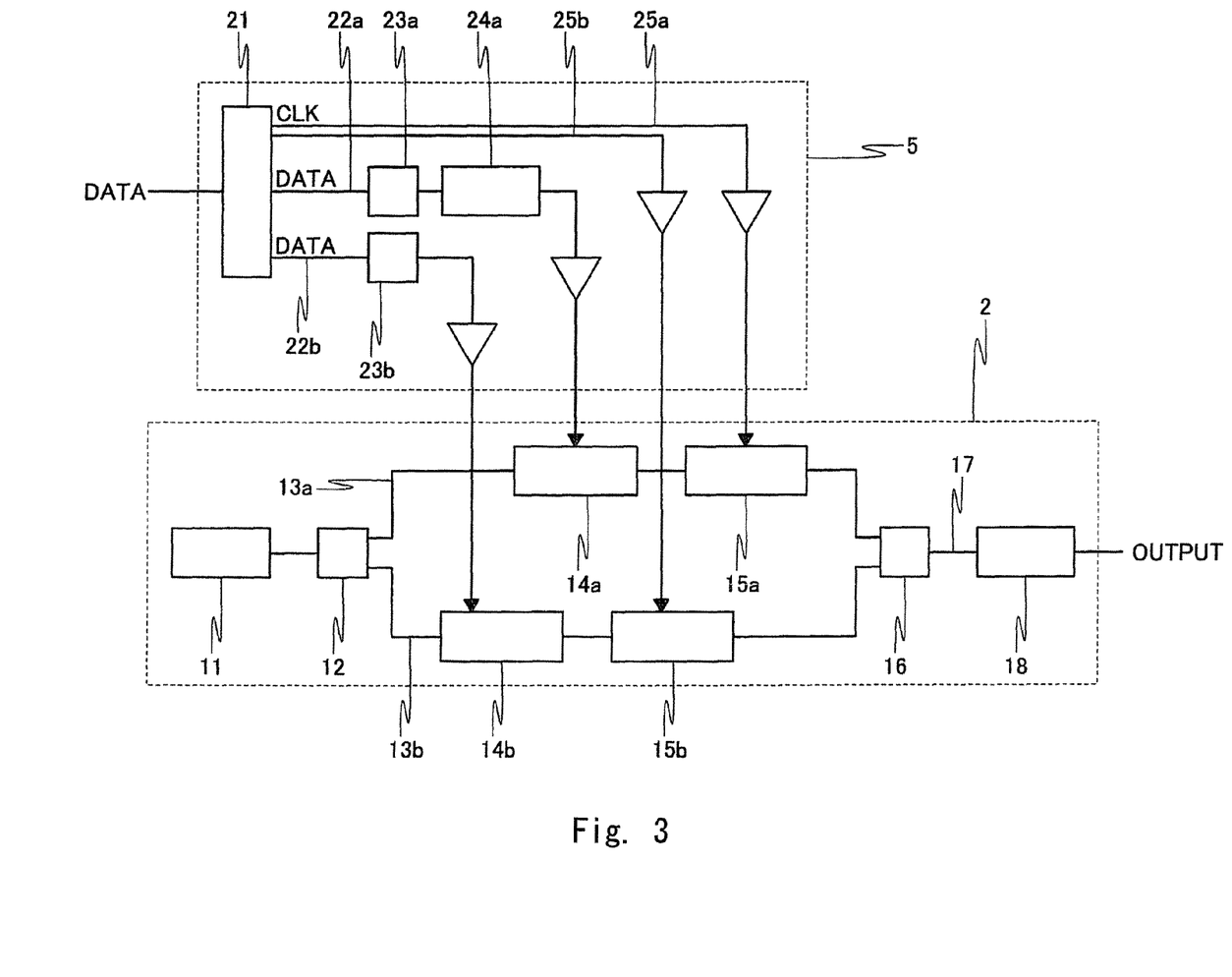
FIG. 3 is a block diagram showing an optical OFDM modulator according to a second exemplary embodiment.

Next, an optical OFDM modulator according to a second exemplary embodiment will be described. The optical OFDM modulator according to this exemplary embodiment has a configuration in which the first optical line 13a is also provided with an optical frequency shifter in the optical OFDM modulator shown in FIG. 1. FIG. 3 is a block diagram showing a configuration of an optical OFDM modulator 200 according to this exemplary embodiment. As shown in FIG. 3, the optical OFDM modulator 200 includes a modulator unit 2 and an electric circuit unit 5.

In the modulator unit 2, the first optical line 13a is provided with an optical frequency shifter 15a and the second optical line 13b is provided with the optical frequency shifter 15b. The other components are similar to those of the modulator unit 1 of the optical OFDM modulator 100 shown in FIG. 1, so the description thereof is omitted.

In the electric circuit unit 5, the clock signal CLK extracted by the serial-to-parallel converter 21 is input to the optical frequency shifter 15a through a clock signal line 25a, and is also input to the optical frequency shifter 15b through the clock signal line 25b. The other components are similar to those of the electric circuit unit 4 of the optical OFDM modulator 100 shown in FIG. 1, so the description thereof is omitted.

Figure 4:
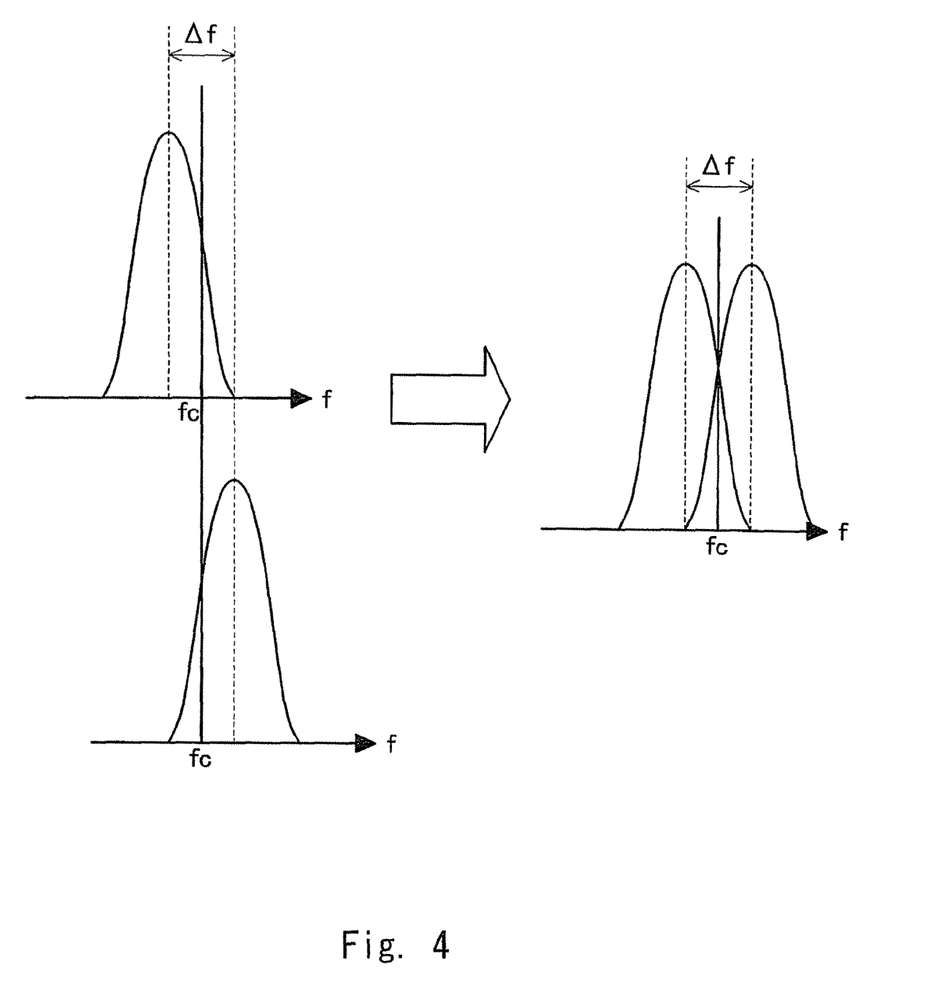
FIG. 4 is an optical frequency-division multiplexing spectrum generated by the optical OFDM modulator according to the second exemplary embodiment.

In the optical OFDM modulator 200, Δf=+1.25 GHz can be applied to the first optical frequency shifter 15a and Δf=−1.25 GHz can be applied to the second optical frequency shifter 15b. FIG. 4 is an optical frequency-division multiplexing spectrum generated by the optical OFDM modulator 200. In FIG. 4, "fc" represents a center wavelength of a channel. As shown in FIG. 4, the center frequency occupied by the output signal to be output can be matched with a carrier wave of the light source, that is, the center wavelength of the channel. When each of the N optical lines is provided with the optical frequency shifter as in this configuration, the frequency spacing Δf between the optical lines can be maintained and can be shifted by an amount corresponding to a given frequency.

Third Exemplary Embodiment

Figure 5:
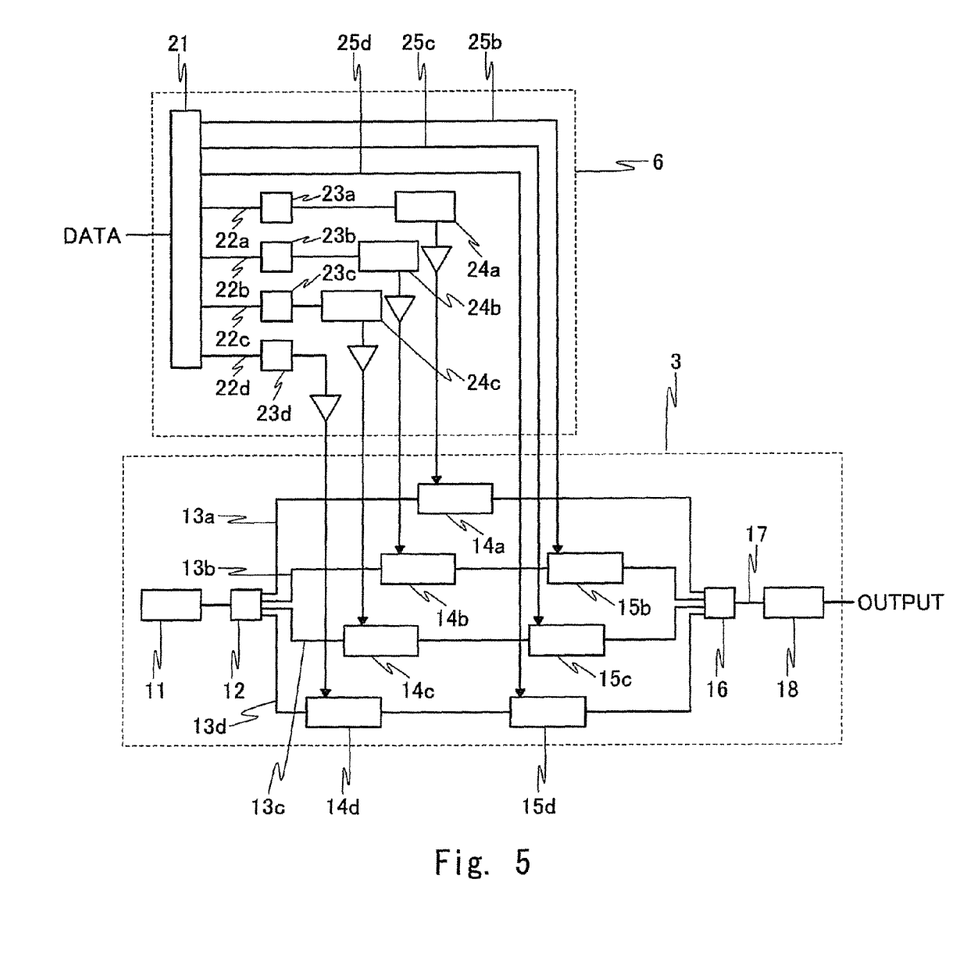
FIG. 5 is a block diagram showing an optical OFDM modulator according to a third exemplary embodiment.

Next, an optical OFDM modulator according to a third exemplary embodiment will be described. This exemplary embodiment illustrates an optical OFDM modulator when N=4. FIG. 5 is a block diagram showing a configuration of an optical OFDM modulator 300 according to this exemplary embodiment. The optical OFDM modulator 300 includes a modulator unit 3 and an electric circuit unit 6. The basic configuration of the optical OFDM modulator 300 is similar to that of the optical OFDM modulator 100 shown in FIG. 1. However, because of the condition of N=4, these optical OFDM modulators are different in the following aspects.

The modulator unit 3 includes first to fourth optical lines 13a to 13d which are respectively provided with first to fourth optical modulators 14a to 14d. The second to fourth optical lines 13b to 13d are respectively provided with optical frequency shifters 15b to 15d. The other components are similar to those of the modulator unit 1 of the optical OFDM modulator 100 shown in FIG. 1.

The signal having a bit rate of B=10[Gbit/s] is divided into N=4 signals in the electric circuit unit 6. Accordingly, signals having a bit rate of 2.5[Gbit/s] are respectively supplied to first to fourth data lines 22a to 22d. The cut-off frequency of each of lowpass filters 23a to 23d is set to 2.5 GHz. Further, the delay circuit 24a applies a delay of 3×Δt (Δt is a time corresponding to one bit, i.e., 100 picoseconds in this case) to a data string passing through the first data line 22a. The delay circuit 24b applies a delay of 2×Δt to the data string passing through the second data line 22b. The delay circuit 24c applies a delay of 1×Δt to a data string passing through the third data line 22c. In the process of generating 2.5[Gbit/s] data strings after parallel conversion of the data, a clock signal having a frequency of 1.25 GHz is extracted. This is derived from the calculation of $\Delta f=1/2N\Delta t=1.25$ GHz. In order to satisfy Formula (1), it is necessary for the optical frequency shifters 15b to 15d to shift frequencies of $\Delta f$, $2\times\Delta f$, and $3\times\Delta f$, respectively. These clock signals are supplied to the optical frequency shifters 15b to 15d through clock signal lines 25b to 25d, respectively. The clock signal lines and other components are similar to those of the electric circuit unit 4 of the optical OFDM modulator 100 shown in FIG. 1.

Figure 6:
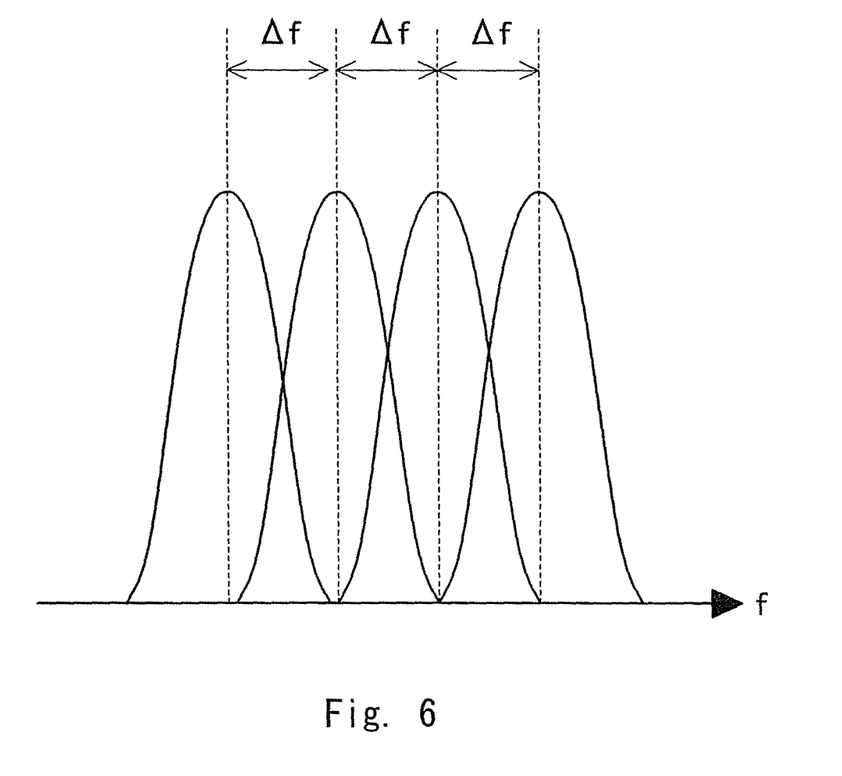
FIG. 6 is an optical frequency-division multiplexing spectrum generated by the optical OFDM modulator according to the third exemplary embodiment.

FIG. 6 is an optical frequency-division multiplexing spectrum generated by the optical OFDM modulator 300. As shown in FIG. 6, optical signals each having a frequency band of about 2.5 GHz are transmitted in an overlapped manner at intervals of 1.25 GHz. Accordingly, the entire frequency band is expressed as 2.5 GHz (each band)×4-1.25 GHz×3 (overlap)=6.25 GHz. This produces the effect of compressing the frequency band to be smaller than 10 GHz, which is a frequency band with no overlap, and further improving the spectral efficiency. Each of the four optical lines may be provided with the optical frequency shifter.

Other Exemplary Embodiment

Note that the present invention is not limited to the above exemplary embodiments, but can be modified as needed without departing from the scope of the present invention. For example, though the above-mentioned exemplary embodiments illustrate configuration examples assuming N=2 or N=4, any integer N equal to or greater than 2 may be adopted as the number of division N. As the number N increases, the entire frequency band becomes narrower, resulting in an improvement in spectral efficiency. Particularly, when 2≤N≤4 holds, the configuration is simple, which enables reduction in size and power consumption of the device as compared with a typical optical OFDM modulator. In any case, a large-scale light source, such as an SC light source, is not required.

Examples of the optical modulator used in the present invention include multi-level modulators such as a well-known Mach-Zehnder (MZ) type optical modulator, electro-absorption (EA) type modulator, and QPSK modulator. Additionally, it is desirable to apply a single-sideband (SSD) modulation to narrow the frequency band of the optical modulation signal, but the modulation method is not limited to this.

Examples of the CW light source include a distributed feedback (DFB) type laser that oscillates at a single wavelength, and a wavelength variable light source capable of setting a multi-channel wavelength.

An optical fiber may be used as the optical line between the optical demultiplexer and the optical multiplexer. Alternatively, the optical line may be configured such that an optical waveguide is formed monolithically or in a hybrid manner on a semiconductor or dielectric.

Moreover, a well-known optical frequency shifter may be used as the optical frequency shifter. For example, the optical frequency shifter may have a configuration in which a well-known optical phase modulator is used to apply an optical SSB modulation and an optical bandpass filter is used in combination to extract only the SSB to remove the remaining carrier waves (for example, Non Patent Literature 3). An optical frequency shifter using an optical SSB modulator in which carrier waves are suppressed (for example, Non Patent Literature 4) may also be applied.

While the present invention has been described with reference to exemplary embodiments, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2009-264078, filed on Nov. 19, 2009, the disclosure of which is incorporated herein in its entirety by reference.

INDUSTRIAL APPLICABILITY

The present invention is applicable to optical communication systems, optical interconnections, and the like.

REFERENCE SIGNS LIST 1-3 MODULATOR UNIT
4-6 ELECTRIC CIRCUIT UNIT
11 LIGHT SOURCE
12 COUPLER
13a-13d OPTICAL LINE
14a-14d OPTICAL MODULATOR
15a-15d OPTICAL FREQUENCY SHIFTER
16 COUPLER
17 OPTICAL LINE
18 OPTICAL AMPLIFIER
21 SERIAL-TO-PARALLEL CONVERTER
22a-22d DATA LINE
23a-23d LOWPASS FILTER
24a-24d DELAY CIRCUIT
25a-25b CLOCK SIGNAL LINE
100, 200, 300 MODULATOR
CLK CLOCK SIGNAL
DATA DATA SIGNAL

The invention claimed is:

1. An optical modulation device comprising:
a converter that receives a data signal having a bit rate of B[Gb/s], divides the data signal into N data strings each having a bit rate of B/N (N is an integer equal to or greater than 2)[Gb/s], and extracts at least one clock signal from the data signal;
a synchronization unit that synchronizes the N data strings;
a light source that emits continuous wave light;
an optical demultiplexer that splits the continuous wave light into N light beams;
a modulator unit that generates N optical signals by modulating the N split continuous wave light beams according to the synchronized N data strings; and
an optical frequency shift unit that shifts center frequencies of the N optical signals by $\Delta f=B/(2N)$[GHz] according to the clock signal.

2. The optical modulation device according to claim 1, wherein
the converter performs a serial-to-parallel conversion for every N bits of the data signal to divide the data signal into the N data strings including first to N-th data strings, and
an i (i is an integer, 2≤i≤N)-th data string is delayed by 1/B[s] with respect to a (i−1)-th data string.

3. The optical modulation device according to claim 2, wherein
the synchronization unit includes (N−1) delay circuits including first to (N−1)-th delay circuits, the (N−1) delay circuits being configured to delay an electric signal passing therethrough, and
a j (j is an integer, 1≤j≤N−1)-th delay circuit delays a j-th data string by $\Delta f(N−j)$[s].

4. The optical modulation device according to claim 1, wherein the modulator unit includes N optical modulators that receive one of the synchronized N data strings in a non-overlapped manner.

5. The optical modulation device according to claim 4, wherein each of the N optical modulators comprises a multi-level optical modulator.

6. The optical modulation device according to claim 4, wherein each of the N optical modulators comprises a Mach-Zehnder type optical modulator.

7. The optical modulation device according to claim 4, wherein each of the N optical modulators comprises an electroabsorption type optical modulator.

8. The optical modulation device according to claim 1, wherein the optical frequency shift unit includes N optical frequency shifters that shift optical frequencies of the N optical signals.

9. The optical modulation device according to claim 8, wherein the converter generates N clock signals to be input to the N optical frequency shifters in a non-overlapped manner, respectively, the N clock signals having frequencies different from each other by $B/(2N)$[GHz].

10. The optical modulation device according to claim 1, wherein the optical frequency shift unit includes (N−1) optical frequency shifters that shift optical frequencies of (N−1) optical signals selected from the N optical signals, respectively.

11. The optical modulation device according to claim 10, wherein the converter generates (N−1) clock signals to be input to the (N−1) optical frequency shifters in a non-overlapped manner, respectively, the (N−1) clock signals having frequencies different from each other by $B/(2N)$[GHz].

12. The optical modulation device according to claim 11, wherein the (N−1) clock signals have a minimum frequency of $B/(2N)$[GHz].

13. The optical modulation device according to claim 8, wherein each of the optical frequency shifters is a suppressed-carrier single-sideband modulator.

14. The optical modulation device according to claim 1, further comprising an optical multiplexer that multiplexes the N optical signals having center frequencies shifted from each other by $\Delta f$[GHz], and outputs output signal light.

15. The optical modulation device according to claim 14, further comprising an optical amplifier that amplifies the output signal light.

16. The optical modulation device according to claim 1, further comprising a frequency band compression unit that compresses each frequency band of the N data strings divided by the converter.

17. An optical modulation method comprising:
dividing a data signal having a bit rate of B[Gb/s] into N data strings each having a bit rate of B/N (N is an integer equal to or greater than 2)[Gb/s], and extracting at least one clock signal from the data signal;
synchronizing the N data strings;
splitting continuous wave light emitted from a light source into N light beams;
generating N optical signals by modulating the N split continuous wave light beams according to the N data strings synchronized; and
shifting center frequencies of the N optical signals by $\Delta f = B/(2N)$[GHz] according to the clock signal.

18. An optical modulation device comprising:
a converter that receives a data signal having a bit rate of B[Gb/s], divides the data signal into N data strings each having a bit rate of B/N (N is an integer equal to or greater than 2)[Gb/s], and extracts at least one clock signal from the data signal;
synchronization means for synchronizing the N data strings;
a light source that emits continuous wave light;
an optical demultiplexer that splits the continuous wave light into N light beams;
modulation means for generating N optical signals by modulating the N split continuous wave light beams according to the synchronized N data strings; and
optical frequency shift means for shifting center frequencies of the N optical signals by $\Delta f = B/(2N)$[GHz] according to the clock signal.

19. The optical modulation device according to claim 18, wherein
the synchronization means includes (N−1) delay circuits including first to (N−1)-th delay circuits, the (N−1) delay circuits being configured to delay an electric signal passing therethrough, and
a j (j is an integer, $1 \leq j \leq N-1$)-th delay circuit delays a j-th data string by $\Delta f(N-j)$[s].

20. The optical modulation device according to claim 18, wherein the modulation means includes N optical modulators that receive one of the synchronized N data strings in a non-overlapped manner.

* * * * *